United States Patent
Pollard et al.

(10) Patent No.: US 10,816,466 B2
(45) Date of Patent: Oct. 27, 2020

(54) ANALYSING APPARATUS AND METHOD

(71) Applicant: Causeway Sensors Limited, Belfast (GB)

(72) Inventors: Robert Pollard, Bangor (GB); Anthony Murphy, Belfast (GB); Breandan Hill, Newtownabbey (GB)

(73) Assignee: Causeway Sensors Limited, Belfast (GB)

( * ) Notice: Subject to any disclaimer, the term of this patent is extended or adjusted under 35 U.S.C. 154(b) by 0 days.

(21) Appl. No.: 15/766,147

(22) PCT Filed: Oct. 4, 2016

(86) PCT No.: PCT/EP2016/073673
§ 371 (c)(1),
(2) Date: Apr. 5, 2018

(87) PCT Pub. No.: WO2017/060239
PCT Pub. Date: Apr. 13, 2017

(65) Prior Publication Data
US 2019/0120762 A1    Apr. 25, 2019

(30) Foreign Application Priority Data
Oct. 6, 2015   (GB) .................................. 1517626.6

(51) Int. Cl.
*G01N 21/03*    (2006.01)
*G01N 21/552*   (2014.01)

(52) U.S. Cl.
CPC .......... *G01N 21/554* (2013.01); *G01N 21/03* (2013.01)

(58) Field of Classification Search
CPC .............................. G01N 21/554; G01N 21/03
See application file for complete search history.

(56) References Cited

U.S. PATENT DOCUMENTS

| | | |
|---|---|---|
| 5,943,136 A | 8/1999 | Pipino |
| 2008/0037022 A1 | 2/2008 | Nishikawa |

(Continued)

FOREIGN PATENT DOCUMENTS

| | | |
|---|---|---|
| WO | 2007102585 A1 | 9/2007 |
| WO | 2007108453 A1 | 9/2007 |

(Continued)

OTHER PUBLICATIONS

International Search Report and Written Opinion of the International Searching Authority from corresponding Patent Cooperation Treaty (PCT) Application No. PCT/EP2016/073673, indicated completed on Jan. 10, 2017.

(Continued)

*Primary Examiner* — Jonathan M Hansen
(74) *Attorney, Agent, or Firm* — Gardner Linn

(57) ABSTRACT

An analysing apparatus comprises a fluid container defining a sample chamber. A sensor having a transparent body with a nanostructured surface is coupled to the fluid container such that the nanostructured surface is exposed to the sample chamber. An excitation and detection apparatus directs a beam of incident polarised electromagnetic radiation onto the reverse face of the body at the Brewster angle, causing no or substantially no reflection of the polarised radiation from the reverse face. The beam of reflected radiation emerges from the reverse face after reflection from the nanostructured surface. The apparatus is simpler and cheaper in comparison with known alternatives that use ATR prisms to create ATR of the light to excite a planar surface.

22 Claims, 4 Drawing Sheets

(56) References Cited

U.S. PATENT DOCUMENTS

2011/0205542 A1* 8/2011 Pendell Jones ...... G01N 21/554
356/445
2011/0212512 A1 9/2011 Wang

FOREIGN PATENT DOCUMENTS

| WO | 2008072156 A2 | 6/2008 |
| WO | 2010066727 A1 | 6/2010 |
| WO | 2014184530 | 11/2014 |

OTHER PUBLICATIONS

UK Search Report for corresponding UK Application No. GB1517626.6, dated Jan. 28, 2016.

* cited by examiner

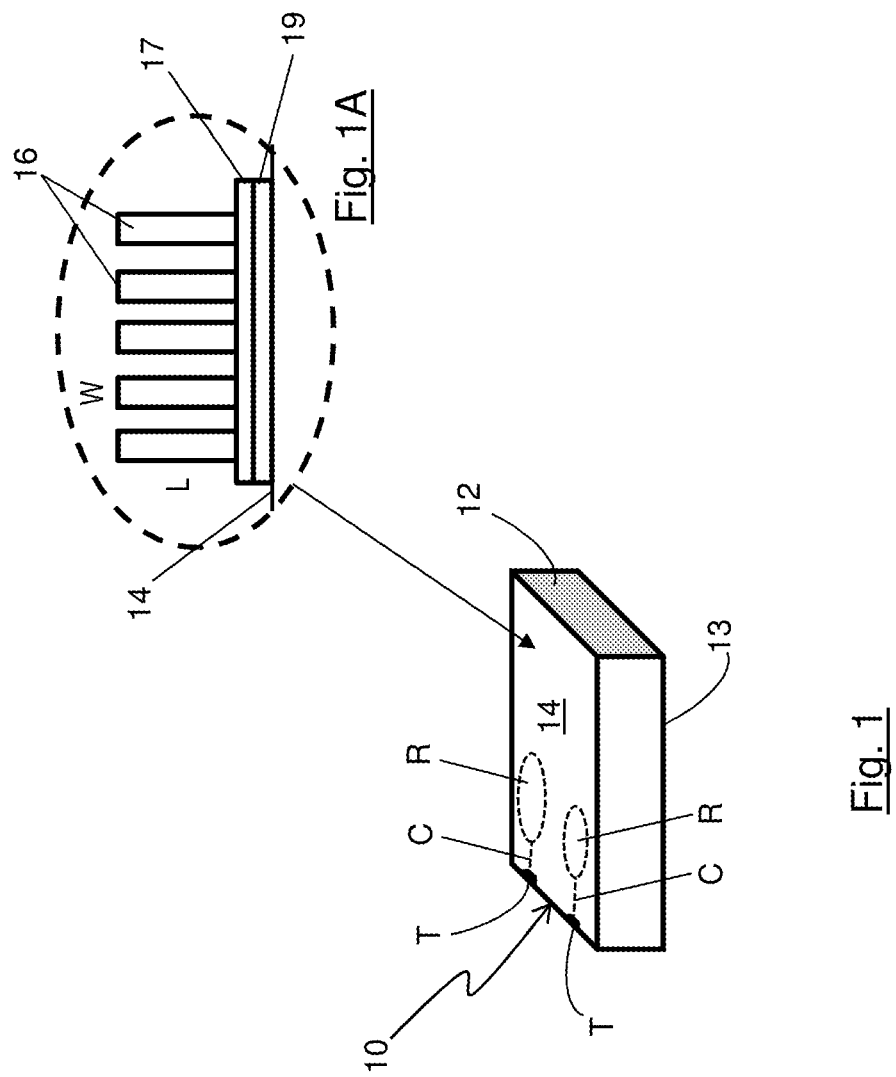

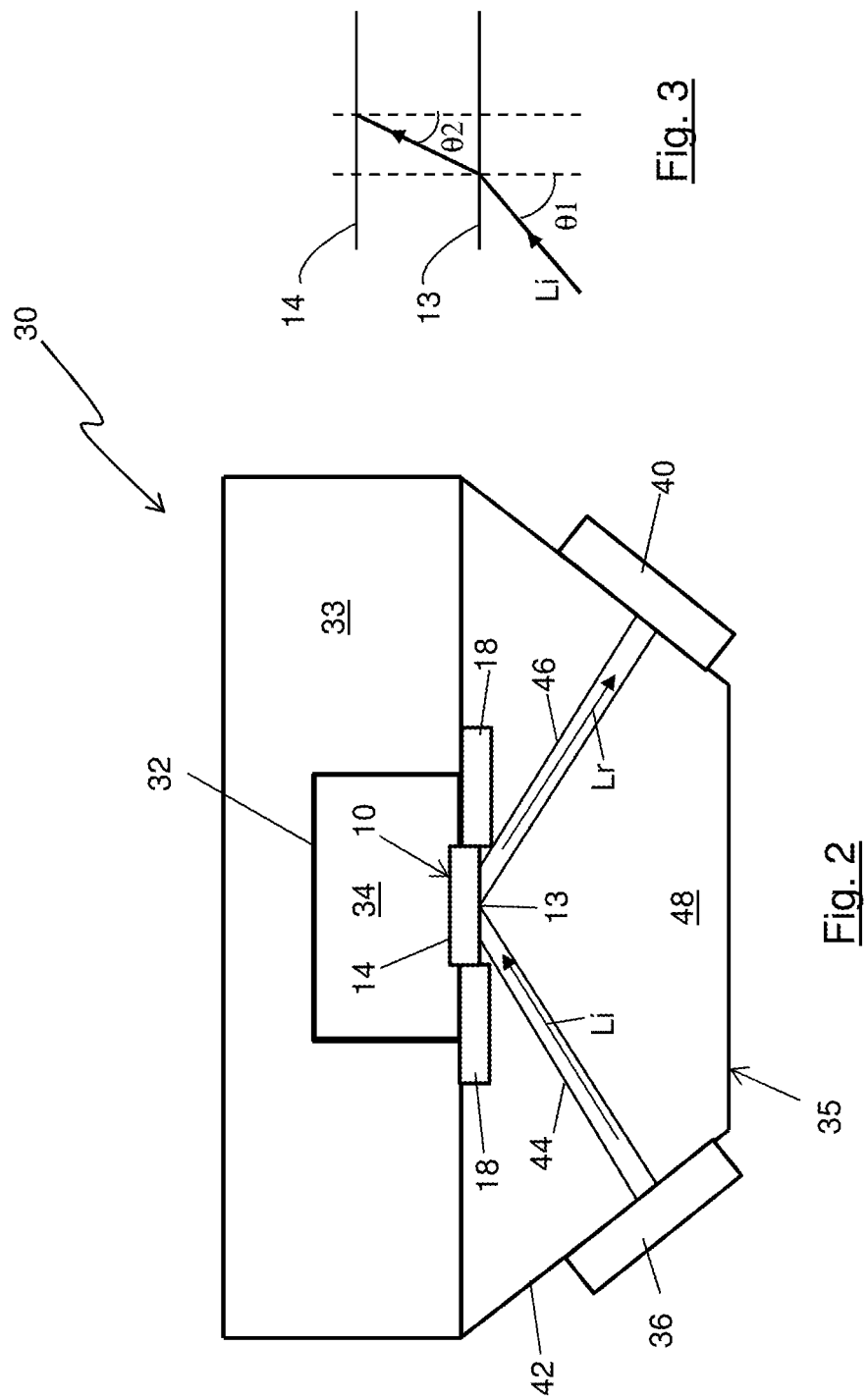

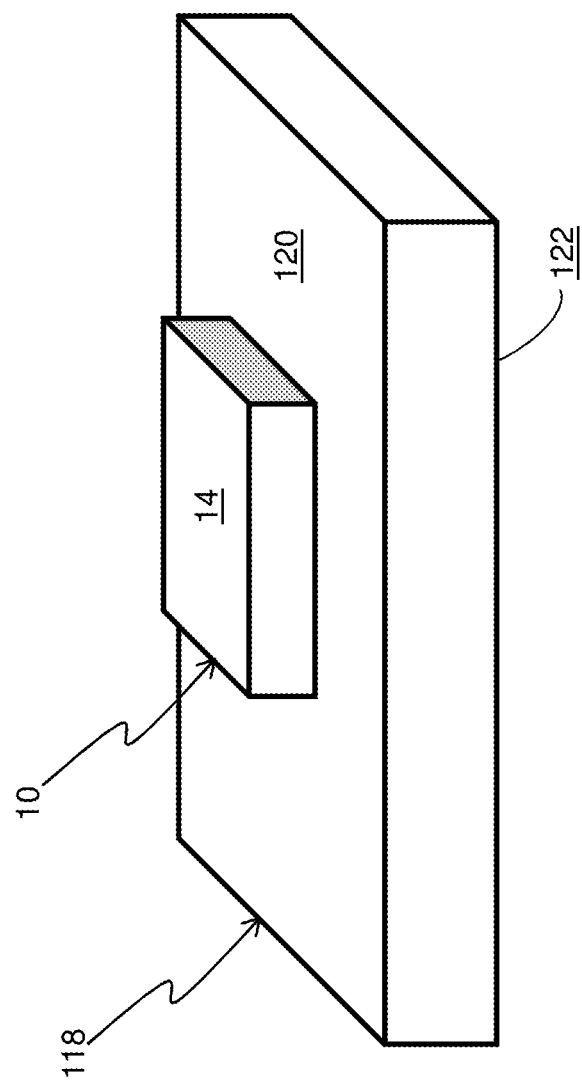

ANALYSING APPARATUS AND METHOD

FIELD OF THE INVENTION

The present invention relates to analysing apparatus and methods. The invention relates particularly to the analysis of chemical and biological material using a plasmonic sensor.

BACKGROUND TO THE INVENTION

Plasma oscillations are rapid oscillations of electron density in conducting media such as plasmas or metals. A plasmon is a quasiparticle resulting from the quantization of these oscillations.

Analysing apparatus using plasmonic sensors to analyse chemical and biological material are known. Typically such apparatus use surface plasmon resonance (SPR) sensors. Surface plasmon resonance (SPR) occurs when polarized light strikes an electrically conducting surface at an interface between two media. This generates electron charge density waves, i.e. plasmons, reducing the intensity of reflected light at a specific angle known as the resonance angle, in proportion to the mass on the sensor surface.

SPR analysing apparatus normally include a cuvette for a liquid assay containing the biological material to be analysed. The cuvette includes an SPR sensor, typically comprising a gold thin film, that is illuminated by polarised light directed through a prism in attenuated total reflection to generate surface plasmons in the sensor. Interactions between the surface plasmons and the biological material affects the light reflected from the sensor and these affects are detected by an optical detector.

It would be desirable to provide an improved plasmonic sensor analysing apparatus.

SUMMARY OF THE INVENTION

A first aspect of the invention provides an analysing apparatus comprising:
a fluid container defining a sample chamber;
a sensor comprising a transparent body with a reverse face and an obverse face, the obverse face having a nanostructured surface, the nanostructured surface comprising a plurality of nanostructures;
an excitation and detection apparatus comprising an excitation source for generating a beam of polarised radiation and a corresponding radiation detector,
wherein, the sensor is coupled to the fluid container such that the nanostructured surface is exposed to the sample chamber,
and wherein the excitation and detection apparatus is configured to direct a beam of incident polarised electromagnetic radiation onto the reverse face of the body at an angle that causes no or substantially no reflection of the polarised radiation from the reverse face,
and wherein said excitation and detection apparatus is configured to direct to said detector a beam of reflected radiation, said beam of reflected radiation comprising said incident radiation emerging in use from the reverse face after reflection from said nanostructured surface.

Preferably, said obverse and reverse faces are substantially parallel with one another. The body is typically substantially planar in shape, said obverse and reverse faces being oppositely disposed on the planar body. The body may be formed from glass.

Preferably, said excitation and detection apparatus includes a medium, typically air, through which said incident radiation beam travels, in use, to said reverse face of the sensor, wherein the refractive index of said medium is less than the refractive index of the material from which said body is made.

Advantageously, said beam of incident radiation comprises p-polarised radiation. The radiation typically has a wavelength between approximately 300 nm to 1500 nm.

In preferred embodiments, the excitation and detection apparatus is configured to direct said beam of incident polarised electromagnetic radiation onto the reverse face of the body through a first medium with a first refractive index, said body being formed from a material with a second refractive index different from said first refractive index, said beam being directed to impinge upon said reverse face substantially at the Brewster angle corresponding to said first and second refractive indices.

Typically, said first medium is air and said second medium is glass, the Brewster angle being approximately 57°.

In preferred embodiments, the nanostructures extend from the obverse face substantially parallel with each other, and are preferably spaced apart from one another. The nanostructures are preferably elongate, having a respective longitudinal axis that is disposed substantially perpendicularly to the obverse face. Typically, the aspect ratio of the length to the width of each nanostructure is greater than 1. At least some and preferably all of the nanostructures may be nanoparticles, having three dimensions on the nanoscale. The nanostructures are preferably provided on a conductive layer on said obverse face.

Typically, the excitation and detection apparatus includes a light guide configured to direct the incident radiation beam to, and the reflected radiation beam from, the reverse face of the body. The light guide typically includes an excitation channel for directing the incident radiation to the reverse face of the body. The light guide typically also includes a detection channel for directing the reflected radiation beam from the reverse face of the body to the detector.

The nanostructured surface may comprise at least one nanostructured region connected to an electrical terminal, preferably a respective electrical terminal where there is more than one nanostructured region. An electrical power source may be connected to the or each electrical terminal. Optionally, said nanostructured surface comprises at least two spaced apart nanostructured regions, each region comprising a respective plurality of said nanostructures, each nanostructured region optionally being connected to a respective electrical terminal. The apparatus may be configured to apply a respective different electrical bias to each of said nanostructured regions. Optionally, the respective nanostructures of each region are configured to resonate when illuminated by radiation at a respective different wavelength. The respective nanostructures of each region may be configured to resonate at a respective wavelength that corresponds to a respective wavelength of the radiation produced by said excitation source. The excitation source may be operable to produce radiation at more than one wavelength, and wherein said nanostructures surface includes at least one nanostructured region for each of said wavelengths in which the respective nanostructures are configured to resonate when illuminated by the radiation at the respective wavelength.

A second aspect of the invention provides a method of analysing a sample using a sensor comprising a transparent body with a reverse face and an obverse face, the obverse face having a nanostructured surface, the nanostructured surface comprising a plurality of elongate nanostructures having a respective longitudinal axis that is disposed substantially perpendicularly to the obverse face, the method comprising:

exposing the nanostructured surface to the sample;

directing a beam of incident polarised electromagnetic radiation onto the reverse face of the body at an angle that causes no or substantially no reflection of the polarised radiation from the reverse face; and directing to a detector a beam of reflected radiation, said beam of reflected radiation comprising said incident radiation that emerges from the reverse face after reflection from said nanostructured surface.

Other features are recited in the dependent claims filed herewith.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example with reference to the accompanying drawings in which:

FIG. 1 is a perspective view of a nanostructured plasmonic sensor for use in analysing apparatus embodying the invention;

FIG. 1A is a detail view of the nanostructured surface of the plasmonic sensor of FIG. 1;

FIG. 2 is a schematic view of an analysing apparatus embodying one aspect of the invention, the apparatus including the plasmonic sensor of FIG. 1;

FIG. 3 is an illustration of radiation incidence angles at the reverse and obverse faces of the sensor;

FIG. 5 is a perspective view of the plasmonic sensor of FIG. 1, showing another embodiment of how the sensor may be mounted on a transparent substrate.

DETAILED DESCRIPTION OF THE PREFERRED EMBODIMENT

Figure 4:
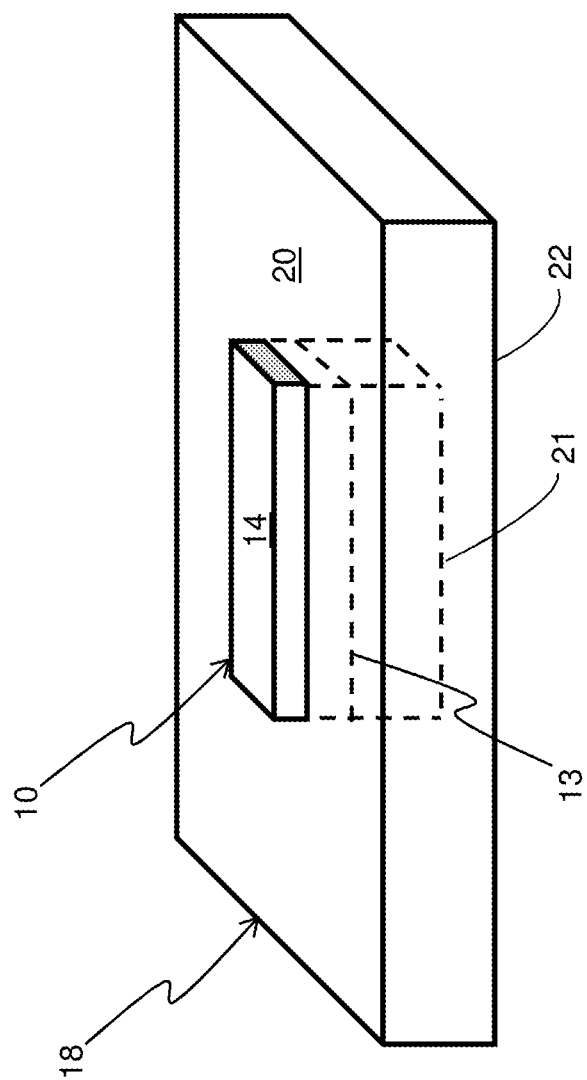
FIG. 4 is a perspective view of the plasmonic sensor of FIG. 1, showing one embodiment of how the sensor may be mounted on a transparent substrate.

Referring now to FIG. 1 of the drawings there is shown, generally indicated as 10, a nanostructured plasmonic sensor. The sensor 10 comprises a body 12 with a reverse face 13 and an obverse face 14, the obverse face 14 having a nanostructured surface.

A nanostructured surface is a surface on which there is formed a plurality of nanostructures. A nanostructure is a structure that has at least one dimension on the nanoscale. For the purposes of the present invention, nanoscale means between 0.1 nm and 1000 nm, more typically between 1 nm and 100 nm.

A nanostructure may have only one dimension on the nanoscale, or two dimensions on the nanoscale, or three dimensions on the nanoscale. Nanostructures having three dimensions on the nanoscale are referred to as nanoparticles.

FIG. 1A shows a more detailed view of the nanostructured surface of the obverse face 14. The nanostructured surface comprises a plurality of nanostructures 16 that are preferably elongate, having a respective longitudinal axis that is disposed substantially perpendicularly to the obverse face 14. The nanostructures 16 may therefore be said to be elongated in a direction perpendicular to the obverse face 14. The nanostructures 16 are therefore substantially parallel with each other. In preferred embodiments, the nanostructures 16 are spaced apart from one another, e.g. each nanostructure 16 is spaced apart from the, or each, adjacent nanostructure 16. Alternatively, at least some and optionally all of the nanostructures 16 are contiguous with the, or each, adjacent nanostructure 16. The nanostructures 16 may be arranged in a one or two dimensional array, preferably being aligned with each other along the, or each, dimension of the array. Advantageously, the aspect ratio of the length L to the width W of each nanostructure 16 is greater than 1. The third dimension (not illustrated) of the nanostructures 16 may be of any desired size depending on the application, for example it may be similar to the width W or the length L, or may be unlimited, e.g. the nanostructures may form a grating. In preferred embodiments, at least some and preferably all of the nanostructures 16 are nanoparticles, having three dimensions on the nanoscale.

For example, some or all of the nanostructures 16 may comprise a wire or a tube, in particular a nanowire or nanotube, which may take any suitable shape for example substantially cylindrical or substantially conical. The nanostructures 16 may be solid or hollow.

The nanostructures 16 are typically formed from an electrically conductive material, typically a metallic material, for example, any of silver, gold, aluminium, platinum, copper or any noble metal or any combinations of the aforesaid.

In typical embodiments, the width W of the nanostructures 16 is approximately 2 nm to approximately 500 nm, usually approximately 10 nm to approximately 100 nm, and the length L of the nanostructures 16 is approximately 10 nm to approximately 2 µm, usually approximately 50 nm to approximately 500 nm. For example, the nanostructures 16 may have a width of approximately 20 nm and a length of approximately 500 nm. It is preferred that the nanostructures 16 are substantially uniform in width and/or height although this need not necessarily be the case.

Typically, the spacing between adjacent nanostructures 16 is approximately 2 nm to approximately 1500 nm, usually approximately 20 nm to approximately 500 nm. In preferred embodiments, the nanostructures 16 are spaced apart from one another by a distance less than the wavelength of the excitation light used to cause plasmonic oscillations, as is described in further detail below. The nanoparticle to nanoparticle separation may be periodic, at a scale of approximately 20 nm to approximately 1.5 µm. The nanoparticle to nanoparticle separation may be quasi-periodic, at a scale of approximately 20 nm to approximately 1500 nm. Typically, the sensor 10 includes in the order of one billion nanoparticles 16.

The body 12 provides a mechanical support for the nanostructures 16. The body 12 may be made of any convenient material, preferably a dielectric material, for example glass, crystal or plastics. Typically, the body 12 is substantially planar in shape, having spaced apart, oppositely disposed obverse and reverse faces 14, 13 that are preferably parallel with one another. By way of example, the body 12 may be between approximately 0.3 to approximately 2 mm thick (i.e. between faces 13, 14. The body 12 is made from material that is transparent to the electromagnetic radiation (usually light radiation) that is used to illuminate the sensor 10, as is described in more detail below. In the case where the illuminating radiation is light, the body 12 may for example be formed from glass.

In typical embodiments, the nanostructures 16 are formed on a layer 17 of electrically conductive material, typically a metallic layer, provided at the obverse face 14 of the body 12, i.e. as part of a nanostructured metallic layer on the body 12. The layer 17 is typically between 1 nm and 10 nm thick. In preferred embodiments the layer 17 is formed from gold but may be formed from any other suitable material, for example silver, aluminium, platinum, copper or any noble metal or any combinations of the aforesaid. Any conventional fabrication technique that is suitable for forming a nanostructured metallic layer may be used to create the layer 17. For example, the nanostructures may be formed by electrodeposition, optionally in pores formed in a layer of insulating material, e.g. aluminium oxide. Typically, an adhesive layer 19 is provided between the body 20 and the metallic layer 17. Any conventional adhesive layer material may be used, e.g. titanium or tantalum, and is typically formed by physical vapour deposition. In alternative embodiments, the layers 17, 19 may be omitted and the nanostructures may be provided on the body by any other means, e.g. by dispersion of a liquid with a dispersion of nanostructures and subsequent evaporation of the liquid.

The layer 17 is made from material that is not only conductive but which is also sufficiently transparent to the electromagnetic radiation (usually light radiation) that is used to illuminate the sensor 10 to allow excitation of the plasmonic modes on the nanostructures 16. In some embodiments the nanostructures 16 may cover the whole of the obverse face 14. Alternatively, the nanostructures 16 cover one or more parts of the obverse face 14. Optionally, the layer 17 may be patterned by any convenient conventional techniques, for example optical, e-beam or other lithographic technique, to spatially define the location of one or more regions in which the nanostructures 16 are provided. By way of example only, FIG. 1 shows two such regions R. The number of regions and the shape, size and spacing of the, or each, region may be selected to suit the application. The density and size of the nanostructures 16 is typically the same in each region R, although either or both of these properties may vary from region to region.

Lithographic techniques can remove the conductive layer 17 in areas defined by any desired pattern such that subsequent growth of the nanostructures 16 only occurs in region(s) where the layer 17 remains. Patterning the layer 17 to define one or more regions R for the nanostructures 16 is useful where, for example, a detector comprising a CMOS or CCD camera is used, since separate nanostructure regions, and hence corresponding optical resonances, will be easily identifiable.

Optionally each nanostructure region R may be electrically biased giving the nanostructures 16 in that region an electrical charge. In this way the binding of biological entities to the surface, during use, is affected as these in many cases have well defined electrical charge states. By controlling the electrical charge of the regions R, each region R may be made to target a different biological entity. To this end, each region R may be electrically connected to an electrical terminal T that may be connected in use, to an electrical power source (not shown) by which a voltage (typically d.c.) may be applied to electrically charge the nanostructures 16 of the respective region R. Optionally a different voltage level, or bias, may be applied to each region R. As a result the respective nanostructures 16 of each region R have a different electrical charge. Conveniently, the terminals T and the electrical connection C connecting them to the respective nanostructure region R may be formed by the layer 17, e.g. by patterning the layer 17 using lithographic or other suitable techniques.

The electrical power source may take any suitable conventional form and may be connected to the terminals T using any suitable conventional connector (not shown).

Formation of the nanostructures 16 in each region may also be achieved by controlled (e.g. in terms of duration of application and/or voltage level) application of voltage to the respective terminal T. The application of electrical voltage to the regions R causes the nanostructures to grow by electrodeposition. The type of nanostructures grown depends on the characteristics of the voltage that is applied. For example, the time for which the voltage is applied may be controlled to control the length of the nanostructures.

In any event, the regions R can be made to have different properties in the nanostructures, e.g. the regions having a respective different size and/or shape. For example one defined area of nanostructure could be longer than another giving a different optical signature. The illuminating excitation source can then be designed to address the different regions of interest by having a multi-spectral output, e.g. being capable of producing illuminating radiation in two or more modes, i.e. at two or more different wavelengths, preferably a respective different wavelength for each type of region R. This may be achieved by, for example using a multi LED light source or having a filter wheel in front of a white light source. The nanostructures 16 resonate when illuminated by radiation at a respective resonant frequency, the resonant frequency depending on one or more of the physical characteristics of the nanostructure (e.g. its length, width and or other relevant dimension). Advantageously the respective nanostructures 16 of each region R are created to have a resonant frequency (or resonant mode) that matches a respective mode of illumination supported by the radiation source. The response of the sensor 10 therefore depends on how it is illuminated. For example, assume the radiation source can produce light at first and second distinct wavelengths of, say, 600 nm and 700 nm. The nanostructures in a first of the regions R are grown to be resonant at 600 nm and those in a second region are grown to be resonant at 700 nm. In this case the illuminating light can be alternated (e.g. by pulsing) between 600 nm and 700 nm and the sensor response would come from the first region and then the second region. Alternatively, the sensor 10 may be excited with both wavelengths at once and the response may be monitored at the different wavelengths, e.g. using filters (not shown) or a spectrometer (not shown).

To facilitate incorporating the sensor 10 into an analysing apparatus, the sensor 10 may be mounted on a carrier 18 that exposes the reverse face 13 to allow the radiation to impinge upon and emerge from the reverse face as described herein, and exposes the obverse face to the sample chamber. The carrier 18 may be formed form any convenient material, e.g. plastics. The preferred carrier 18 is illustrated in FIGS. 4 and 4A and comprises a body in which a through-aperture 21 is formed, the sensor 10 being mounted in the aperture 21 such that its faces 13, 14 are exposed. The body may for example comprise a substantially planar body and may be in the order of 1 mm thick.

FIG. 5 shows an alternative embodiment in which the sensor 10 is mounted on a transparent carrier 118 having no through-aperture. The carrier 118 is substantially planar in shape, having oppositely disposed obverse and reverse faces 120, 122 that are preferably parallel with one another. Conveniently, the carrier 118 comprises a slide of transparent material. The reverse face 13 of the sensor 10 is mounted on the obverse face 120 of the carrier 118. Optionally, a layer of index-matching material is provided between the carrier 118 and the sensor 10 to reduce or eliminate reflection and refraction of the illuminating radiation at the interface between the carrier 118 and the sensor 10. Any conventional index-matching material may be used, e.g. epoxy resin or any suitable synthetic adhesive, usually in a liquid or gel form. Typically, the index-matching material also serves as an adhesive for holding the carrier 118 and the sensor 10 together.

Referring now to FIG. 2, there is shown an analysing apparatus 30 comprising a fluid container 32, e.g. a cuvette, defining a sample chamber 34 for containing a sample, e.g. an assay sample, to be analysed. Typically the sample is a liquid or fluid that includes chemical or biological material. The sensor 10 is coupled to the fluid container 32 (via the carrier 18 in this example) such that the obverse face 14 and in particular the nanostructured surface is exposed to the chamber 34, i.e. exposed to and typically immersed in the sample during use. Preferably, there is direct contact between the nanostructured surface of the sensor 10 and the sample during use. A seal (not shown) such as an O-ring is typically provided between the sensor 10 and the fluid container 32 to keep the sample within the chamber 34. The reverse face 13 of the sensor 10 is exposed to allow excitation radiation to be directed onto the reverse face 13 of the sensor 10, thereby reaching the nanoparticles 16 through the body 12, and to allow radiation reflected from the nanoparticles 16 to emerge out of the body 12 through the reverse face 13.

The analysis apparatus 30 includes an excitation and detection apparatus 35 configured to direct a beam of incident radiation Li, e.g. a beam of light in preferred embodiments, from an excitation source 36 to the sensor 10, and in particular to the reverse face 13 of the body 12, and to direct a beam of reflected radiation Lr, e.g. a beam of reflected light in preferred embodiments, from the sensor 10, and in particular radiation emerging from the sensor 10 through the reverse face 13 to a detector 40.

Conveniently, the container 32 is received in a cuvette block 33 which can be releasably secured to the excitation and detection apparatus 35, for example by one or more clamps (not shown). The carrier 18 may be fixed to the block 33 by any convenient means, e.g. adhesive, or under the action of the clamps. In use, the sensor 10 is positioned between the block 33 and the excitation and detection apparatus 35.

The excitation source 36 generates a beam of electromagnetic radiation. In typical embodiments the excitation source 36 is of a type that generates light, especially visible light but more generally light having a wavelength typically between approximately 300 nm to 1500 nm.

More particularly, the preferred excitation source 36 is of a type that generates polarised light, preferably p-polarised light, also known as transverse-magnetic light. P-polarized light is linearly polarized light with polarization direction lying in the plane of incidence. The plane of incidence is the plane which contains the surface normal and the propagation vector of the incoming light radiation. Polarized light with its electric field along the plane of incidence is thus denoted p-polarized. P polarized radiation is commonly referred to as transverse-magnetic (TM) radiation. By way of example a stand LED light source with a polarising filter may be used as the light source 36.

The detector 40 detects electromagnetic radiation that is reflected from the sensor 10. The detector is of a type that is compatible with the excitation source 36 and so, in typical embodiments, comprises a light detector. e.g. a photodetector such as the Thorlabs PDA 100 (trade mark).

In preferred embodiments, the excitation and detection apparatus 35 includes a light guide 42 configured to direct the incident and reflected beams Li, Lr to and from the sensor 10. The preferred light guide 42 includes an excitation channel 44 for directing the incident radiation to the sensor 10. The channel 44, which is typically linear, extends from the excitation source 36 to the exposed reverse face 13 of the body 12. The light guide 42 preferably includes a detection channel 46 for directing the reflected radiation to the detector 40. The detection channel 46, which is typically linear, extends from the exposed reverse face 13 of the body 12 to the detector 40. Optionally, the channels 44, 46 contact the reverse face 13 at a respective separate part of the reverse face 13.

In alternative embodiments, the light guide 42 and channels 44, 46 may be omitted. In such cases, the excitation and detection apparatus may for example comprise the excitation source, the detector and means for focussing and/or collimating one or both of the radiation beams, e.g. one or more lenses, and/or the excitation source may be of a type that generates a focussed beam, e.g. a laser. For example the excitation and detection apparatus may comprise a hollow block on which the excitation source and detector are mounted and positioned to direction light to and receive light from the sensor through the hollow interior of the block. Optionally, one or more focussing and/or collimating lenses may be provided at the excitation source and/or at the detector. Optionally, a non-reflective coating may be applied to the interior of the block.

In the illustrated embodiment, the light guide 42 has a solid body 48 in which the channels 44, 46 are formed by any conventional means, e.g. drilling or moulding. In alternative embodiments, the body 48 need not be solid. For example it may comprise a frame holding one or more tubes which define the or each channel 44, 46. In any event, the walls forming the channels 44, 46 are typically opaque to the radiation although this is not essential depending on how the radiation is carried through the channels 44, 46. For example, the radiation may propagate directly through the, or each, channel 44, 46 in which case the channel walls should be opaque. Alternatively, the radiation may propagate through a light guide, e.g. a fibre optic cable, which is located in the respective channel 44, 46, in which case the channel walls need not be opaque. Optionally, a non-reflective coating may be applied to the interior surface of the channels.

In preferred embodiments, the excitation and detection apparatus 35 is configured so that the excitation radiation Li is incident on the reverse face 13 of the body 12 at an angle θ1, measured with respect to the surface normal, that is equal to or substantially equal to the Brewster angle (also known as Brewster's angle or the polarisation angle). The Brewster angle is the angle of incidence at which light with a particular polarization, in this case p-polarisation, is perfectly transmitted through the surface, in this case the reverse face 13 of the body 12, of a transparent medium when passing from a first medium to a second medium which have different refractive indicies, with no reflection from the surface. In this example, the first medium is that of the channel 44 and is typically air, while the second medium is that of the body 12, which is typically glass. The Brewster angle for an air/glass interface is approximately 57° (where the glass has a refractive index of 1.52). It will be understood that the Brewster angle may be different for different media that may be used in alternative embodiments of the invention, including glass having a different refractive index than 1.52.

Hence, in the preferred embodiment, the channel 44 is angled with respect to the reverse face 13 such that the radiation beam Li is incident on the reverse face 13 at or substantially at the Brewster angle, thereby eliminating or substantially eliminating reflections from the reverse face 13. In embodiments where the light guide is omitted, the radiation may be directed by other means as indicated above, but still passes through a medium, typically air, as it travels from the excitation source to the reverse face of the sensor, and from the sensor to the detector. In such cases, the medium is contained within the excitation and detection apparatus 35, e.g. in one or more chambers through which the radiation travels.

In use, and as illustrated in FIG. 3, when the excitation beam Li hits the reverse face 13, it is refracted by the body 12. Hence, the angle of incidence θ2 of the excitation beam Li at the obverse face 14 of the body 12 (with respect to the normal of those surfaces) is less than the angle of incidence θ1 of the beam Li at the reverse face 13 (with respect to the normal) of the substrate 18. Advantageously, the arrangement is such that θ2 is less than the angle required to achieve attenuated total reflection (ATR) within the body 12. Typically, the body 12 is made of a material (e.g. glass) having a higher refractive index than the medium (e.g. air) through which the light is propagated to reach the body 12.

In use, plasmonic oscillations, which may also be referred to as plasmonic resonance, are caused in the nanostructured surface 14 of the sensor 10 in response to radiation beam Li incident at the reverse of the nanostructured face 14 of the sensor, advantageously at an angle of incidence below that required for ATR. Plasmonic oscillations occur in the nanostructured surface in a direction that is normal to the obverse face 14. More generally, the plasmonic oscillations occur in directions that are possible to be excited by the radiation. In the preferred embodiments where the nanostructures 16 are elongate, plasmonic oscillations occur both along and transverse to the longitudinal axis of the nanostructures 16. The plasmonic oscillations along the longitudinal axis resonances are in this case used for sensing, which requires a component of the excitation light to be at non-normal incidence on the reverse face 13.

In the preferred mode of use, a mode of radiation is excited between the nanostructures 16, an in particular in the spaces between the nanostructures. For this to occur a component of momentum in the excitation radiation Li is in the direction of the longitudinal axis of the nanostructures 16. This direction is perpendicular to faces 14 and 13. Hence, the nanostructures 16 are excited with P polarised radiation at an angle oblique to the surface normal of 14. The preferred mode of operation requires the nanostructures 16 to be extending perpendicularly to the conductive layer 17, and illumination by the radiation Li through the layer 17, i.e. the radiation Li is incident on the underside of the layer 17 with respect to the nanostructures, to properly excite the mode.

In preferred embodiments therefore, the Incident radiation Li is at an oblique angle and polarised with an electrical component along the length of the nanostructures 16. This excites a "longitudinal" localised surface plasmon resonance (along the length), which for an isolated gold nanorod naturally resonates in the Infrared wavelength regime (1000 nm). The preferred arrangement of nanostructures 16, particularly their close packed nature (i.e. with a spacing of less than 50 nm) means the localised resonance modes delocalise, and energy is transferred to neighbouring nanostructures. This has an effect of shifting the resonance into the visible wavelength regime (550-700 nm), depending on the geometry and spacing of the nanostructures, which is more desirable for most optical applications. The resonance mode is further altered by the conductive layer 17, which has a waveguiding nature, further adding to the delocalisation of the mode. Exciting the nanostructures 16 in this configuration means the electric field enhancements from the "isolated" longitudinal plasmon resonance are no longer confined at the tips of nanostructures 16 but are in the space between the nanostructures 16. This means the most sensitive part of the sensor 10 is where biological interactions will occur.

In preferred embodiments, ATR is not possible at face 14 because face 13 is parallel to it. For ATR to occur, a prism (not shown) would have to be used instead of the preferred slide. Accordingly, in preferred embodiments, plasmons can be excited in the nanostructured surface 14 with the excitation incident at any angle without getting to an ATR angle. The only incidence angle that gives low reflection from parallel face 13 is the Brewster angle.

Advantageously the incident radiation impinges on the face 13 at the Brewster angle to eliminate or substantially eliminate reflections from the face 13. The incident radiation Li subsequently impinges on the reverse of the nanostructured surface 14, and is reflected by the reverse face of the nanostructured surface 14 whereupon it travels back through the body 12, emerging from the reverse face 13 and being directed to the detector 40 as the reflected radiation beam Lr. Advantageously, there is no ATR of the beams Li, Lr within the body 12. In preferred embodiments, the reflected beam Lr is directed from the body 12 to the detector 40 by the channel 46 (either directly by the channel 46 or by a light guide (not shown) located in the channel 46).

The plasmonic oscillations in the nanostructured surface 14 of the sensor 10 interact with the sample in the chamber 34 and, depending on what is contained in the sample, these interactions affect one or more characteristics of the reflected beam Lr, for example its intensity. For example, changes in the intensity (e.g. a modulation of intensity) can be caused by an alteration of the resonance conditions of the nanostructures 16. Hence, by analysing one or more characteristics of the reflected beam Lr, the detector 40 can determine one or more characteristics of the sample, e.g. relating to its composition. Any suitable conventional analysis may be used for this purpose.

It will be seen that in preferred embodiments, plasmonic oscillations in the sensor 10 are caused by an excitation beam Li incident on the reverse face nanostructured surface 14. The Brewster angle is not used to get minimum reflectivity at the reverse face nanostructure surface 14; instead preferred embodiments use the Brewster angle for p-polarised radiation to minimise unwanted reflection from the reverse face 13 of the body 12. This is possible because the nanostructured surface 14 of the sensor 10 can generate plasmonic oscillations when excited at an angle less than required for ATR.

This makes the apparatus 30 simpler and cheaper in comparison with known alternatives that use ATR prisms to create ATR of the light to excite surface plasmons in a gold or silver planar film.

The invention is not limited to the embodiment(s) described herein but can be amended or modified without departing from the scope of the present invention.

The invention claimed is:

1. An analyzing apparatus comprising:
    a fluid container defining a sample chamber;
    a sensor comprising a transparent body with a reverse face and an obverse face, said obverse face having a nanostructured surface, said nanostructured surface comprising a plurality of nanostructures;
an excitation and detection apparatus comprising an excitation source for generating a beam of polarized radiation and a corresponding radiation detector;
wherein, said sensor is coupled to said fluid container such that said nanostructured surface is exposed to said sample chamber;
wherein said excitation and detection apparatus is configured to direct a beam of incident polarized electromagnetic radiation onto said reverse face of said body at an angle that is oblique to said reverse face;
wherein said excitation and detection apparatus is configured to direct to said detector a beam of reflected radiation, said beam of reflected radiation comprising the incident polarized radiation emerging through said reverse face after reflection from said nanostructured surface; and
wherein said nanostructures have a respective longitudinal axis that is disposed substantially perpendicularly to said obverse face, said nanostructures are elongate such that a length of the respective nanostructure along said longitudinal axis is greater than a width of the respective nanostructure, and said nanostructures are spaced apart from one another by a distance less than a wavelength of the incident polarized electromagnetic radiation to cause, in response to incidence of said polarized electromagnetic radiation on said reverse face, plasmonic oscillations in said nanostructured surface in a direction that is normal to said obverse face.

2. The apparatus of claim 1, wherein said obverse and reverse faces are substantially parallel with one another.

3. The apparatus as claimed in claim 1, wherein said excitation and detection apparatus includes a medium through which said beam of incident radiation travels to said reverse face of said sensor, wherein a refractive index of said medium is less than a refractive index of a material from which said body is made.

4. The apparatus of claim 1, wherein said beam of incident radiation comprises p-polarized radiation.

5. The apparatus of claim 1, wherein the incident radiation has a wavelength between approximately 300 nm to 1500 nm.

6. The apparatus of claim 1, wherein said excitation and detection apparatus is configured to direct said beam of incident polarized electromagnetic radiation onto said reverse face of said body through a first medium with a first refractive index, said body being formed from a material with a second refractive index different from said first refractive index, said beam of incident radiation being directed to impinge upon said reverse face substantially at a Brewster angle corresponding to said first and second refractive indices.

7. The apparatus as claimed in claim 6, wherein said first medium is air and said second medium is glass, said angle being approximately 57°.

8. The apparatus of claim 1, wherein said excitation and detection apparatus is configured to direct said beam of incident polarized electromagnetic radiation onto said reverse face of said body and, upon travelling though said body, said body refracts said beam of incident radiation such that said beam of incident radiation impinges upon said nanostructured surface at an angle that is less than an angle required to achieve an attenuated total reflection (ATR) within said body.

9. The apparatus of claim 1, wherein the nanostructures are substantially parallel with each other.

10. The apparatus of claim 1, wherein at least some of said nanostructures are nanoparticles, having three dimensions on nanoscale.

11. The apparatus of claim 1, wherein said nanostructures formed from an electrically conductive material, typically a metallic material.

12. The apparatus of claim 1, wherein said nanostructures are formed on an electrically conductive layer provided at said obverse face of said body.

13. The apparatus of claim 1, wherein said excitation and detection apparatus includes a light guide configured to direct said beam of incident radiation to and said beam of reflected radiation from said reverse face of said body.

14. The apparatus of claim 13, wherein said light guide includes (i) an excitation channel for directing the incident radiation to said reverse face of said body from said excitation source and (ii) a detection channel for directing the reflected radiation from said reverse face of said body to said detector.

15. The apparatus of claim 14, wherein said excitation and detection channels contact said reverse face at a respective separate part of said reverse face.

16. The apparatus of claim 1, further including a cuvette block having a recess for receiving said fluid chamber, said cuvette block being releasably securable to said excitation and detection apparatus.

17. The apparatus of claim 1, wherein said nanostructured surface comprises at least one nanostructured region connected to an electrical terminal, preferably a respective electrical terminal where there is more than one nanostructured region.

18. The apparatus of claim 1, wherein said nanostructured surface comprises at least two spaced apart nanostructured regions, each region comprising a respective plurality of said nanostructures, wherein the respective nanostructures of each region are configured to resonate when illuminated by radiation at a respective different wavelength.

19. A method of analyzing a sample using a sensor comprising a transparent body with a reverse face and an obverse face, the obverse face having a nanostructured surface, the nanostructured surface comprising a plurality of elongate nanostructures having a respective longitudinal axis that is disposed substantially perpendicularly to the obverse face, the nanostructures having a respective longitudinal axis that is disposed substantially perpendicularly to the obverse face and being elongate such that a length of the respective nanostructure along said longitudinal axis is greater than a width of the respective nanostructure, the nanostructures being spaced apart from one another by a distance that is less than a wavelength of the incident polarized electromagnetic radiation, the method comprising:
exposing the nanostructured surface to the sample;
directing a beam of the incident polarized electromagnetic radiation onto the reverse face of the body at an angle that is oblique to the reverse face to cause plasmonic oscillations in the nanostructured surface in a direction that is normal to the obverse face; and
directing to a detector a beam of reflected radiation, the beam of reflected radiation comprising the incident radiation that emerges from the reverse face after reflection from the nanostructured surface.

20. An analyzing apparatus comprising:
a fluid container defining a sample chamber;
a sensor comprising a transparent body with a reverse face and an obverse face, said obverse face having a nanostructured surface, said nanostructured surface comprising a plurality of nanostructures;

an excitation and detection apparatus comprising an excitation source for generating a beam of polarized radiation and a corresponding radiation detector;

wherein, said sensor is coupled to said fluid container such that said nanostructured surface is exposed to said sample chamber;

wherein said excitation and detection apparatus is configured to direct a beam of incident polarized electromagnetic radiation onto said reverse face of said body at an oblique angle;

wherein said excitation and detection apparatus is configured to direct to said detector a beam of reflected radiation, said beam of reflected radiation comprising the incident radiation emerging from said reverse face after reflection from said nanostructured surface;

wherein said nanostructures have a respective longitudinal axis that is disposed substantially perpendicularly to said obverse face, said nanostructures are elongate such that a length of the respective nanostructure along said longitudinal axis is greater than a width of the respective nanostructure, and said nanostructures are spaced apart from one another by a distance that is less than a wavelength of the incident radiation, and wherein said distance causes localized plasmonic resonance of neighbouring nanostructures to interact with each other to cause, in response to incidence of said polarized electromagnetic radiation on said reverse face, plasmonic oscillations in said nanostructured surface in a direction that is normal to said obverse face.

21. The method of claim 19, further including using said plasmonic oscillations that are normal to the obverse face to sense said sample.

22. The method of claim 19, further including selecting said distance to cause localized plasmonic resonance of neighbouring nanostructures to interact with each other.

* * * * *